(12) United States Patent
Hirasa et al.

(10) Patent No.: US 6,551,394 B2
(45) Date of Patent: Apr. 22, 2003

(54) RECORDING LIQUID, PRINTED PRODUCT AND INK JET RECORDING METHOD

(75) Inventors: Takashi Hirasa, Yokohama (JP); Ken-ichiro Sasaki, Yokohama (JP); Tetsuo Murayama, Yokohama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 10/096,483

(22) Filed: Mar. 13, 2002

(65) Prior Publication Data

US 2002/0124769 A1 Sep. 12, 2002

Related U.S. Application Data

(62) Division of application No. 09/386,293, filed on Aug. 31, 1999, now Pat. No. 6,383,278.

(30) Foreign Application Priority Data

Sep. 1, 1998 (JP) .............................. 10-246598
Dec. 22, 1998 (JP) .............................. 10-365283

(51) Int. Cl.$^7$ .............................. C09D 11/00
(52) U.S. Cl. ................. 106/31.65; 106/31.9; 106/476
(58) Field of Search ............... 106/31.65, 31.9, 106/476

(56) References Cited

U.S. PATENT DOCUMENTS

| | | | |
|---|---|---|---|
| 5,184,148 A | 2/1993 | Suga et al. | 106/31.9 |
| 5,439,514 A | 8/1995 | Kashiwazaki et al. | 106/31.6 |
| 5,531,818 A * | 7/1996 | Lin et al. | 106/31.28 |
| 5,538,548 A | 7/1996 | Yamazaki et al. | 106/31.65 |
| 5,542,969 A | 8/1996 | Hirasa et al. | 106/472 |
| 5,599,859 A | 2/1997 | Tonogaki et al. | 524/95 |
| 5,604,273 A * | 2/1997 | Suga | 106/31.28 |
| 5,658,376 A | 8/1997 | Noguchi et al. | 106/31.43 |
| 5,919,294 A | 7/1999 | Hirasa et al. | 106/31.9 |
| 6,027,210 A | 2/2000 | Kurabayashi et al. | 106/31.75 |
| 6,171,382 B1 * | 1/2001 | Stubbe et al. | 106/31.86 |

FOREIGN PATENT DOCUMENTS

| | | |
|---|---|---|
| EP | 0 441 987 A | 8/1991 |
| EP | 0 704 503 A1 | 4/1996 |
| EP | 0 704 503 A | 4/1996 |
| EP | 0 718 383 A | 6/1996 |
| EP | 0 805 191 A2 | 11/1997 |
| EP | 0 805 191 A | 11/1997 |
| EP | 0 962 504 A | 12/1999 |

OTHER PUBLICATIONS

Derwent Abstract, 1p. JP 9183934 A, Jul. 1997.
Derwent Abstract, 1p. JP 3134073 A, Jun. 1997.
Takahashi Hirasa et al., IS&Ts NIP 16:2000 *International Conference on Digital Printing Technologies*, pp. 632–635, No date available.

* cited by examiner

Primary Examiner—Helene Klemanski
(74) Attorney, Agent, or Firm—Oblon, Spivak, McClelland, Maier & Neustadt, P.C.

(57) ABSTRACT

A recording liquid characterized in that when it is printed with 100% duty and with a resolution of 600×300 dpi on an electrophotographic paper having a S.A.D (Surface Area Difference) of from 6.0 to 9.0 and a pH of from 6 to 8, the S.A.D. of the printed portion is at least 59.5.

3 Claims, No Drawings

RECORDING LIQUID, PRINTED PRODUCT AND INK JET RECORDING METHOD

This application is a Division of application Ser. No. 09/386,293 Filed on Aug. 31, 1999 now U.S. Pat. No. 6,383,278

The present invention relates to a recording liquid employing an aqueous medium. Particularly, it relates to a recording liquid for writing or ink jet printing, especially a recording liquid suitable for ink jet printing.

Heretofore, a water-color ink containing an acid dye or a direct dye dissolved in an aqueous medium, or a solvent-type ink containing an oil-soluble dye dissolved in an organic solvent, has been used as a recording liquid for ink jet printing. The solvent type ink contains a solvent and thus has a problem from the viewpoint of environmental safety, and it is not suitable for use in offices. On the other hand, the water-color ink containing a water-soluble dye, has a problem that the record will be poor in water resistance, when recording is made on a pulp paper. The record with the ink also has a poor light resistance. The same problems are also found in the recording liquid for writing.

To solve such problems, it has been proposed to use an aqueous dispersion ink employing a water-insoluble pigment with excellent water resistance and light resistance as a coloring material. However, with the conventional aqueous dispersion ink of a water-insoluble pigment, its storage stability and the recording density of the record were inadequate, and it was difficult to satisfy the properties of the record such as improvement of the printing density, prevention of printing irregularities, etc. and the properties of the recording liquid such as the storage stability, the jetting stability, etc., at the same time. Accordingly, further improvements have been desired.

It is an object of the present invention to provide an aqueous dispersion ink which, even when recorded on pulp paper or regenerated paper by writing or ink jet recording, gives a record with a high density and good printing quality and which is excellent in the storage stability and the jetting durability, whereby a record excellent also in fastness such as light resistance or water resistance, can be obtained.

As a result of various studies for improving the printing density of an aqueous dispersion black ink employing a water-insoluble pigment, the present inventors have found that the S.A.D. (Surface Area Difference) of a printed portion when a recording liquid is solid-printed on a pulp paper, interrelates to and gives a substantial influence to both the storage stability of the recording liquid and the printing irregularities, and recording density of the printed product. The present invention has been accomplished on the basis of this discovery. By the present invention, it will be possible to obtain a recording liquid which is capable of satisfying the high printing density of the record and the storage stability and jetting stability of the recording liquid, at the same time.

That is, the present invention provides a recording liquid characterized in that when it is printed with 100% duty and with a resolution of 600×300 dpi on an electrophotographic paper having a S.A.D (Surface Area Difference) of from 6.0 to 9.0 and a pH of from 6 to 8, the S.A.D. of the printed portion is at least 59.5.

In short, the present invention defined the recording liquid in terms of the S.A.D. of the printed portion which is in the specific range. Whereas, with conventional ink jet recording liquids, the S.A.D. values as defined by the present invention are at a level of about 59.2 at best.

Now, the present invention will be described in detail with reference to the preferred embodiments.

The S.A.D. (Surface Area Difference) as defined by the present invention, represents the specific surface area of a record and is a parameter defined by the following formula. In the present invention, the following conditions are to be employed for its measurement.

$$S.A.D \text{(Surface Area Difference)} = \{(\Sigma Si/\Sigma Pi) - 1\} \times 100(\%)$$

where $Si$ is the area of every triangle formed by adjacent three data points, $Pi$ is the area when $Si$ is projected to a xy plane, $\Sigma Si$ is the sum of all $Si$, and $\Sigma Pi$ is the sum of all $Pi$.

Measuring Method

Apparatus: Scanning Probe Microscope

Type of Machine: NanoScope III, manufactured by Digital Instruments Company

Scanner: J-Head

Measured Region: 1 $\mu$m×1 $\mu$m

Number of Pixels: 512×512

Scan Rate: 1.5 Hz

Measuring Mode: Tapping AFM

Probe: Si-DF 20, manufactured by Seiko Instruments Company

Image Treatment: Planefit Auto Tertiary

In the present invention, printing is carried out with 100% duty and with a resolution of 600×300 dpi on an electrophotographic paper, such as 4024 paper (manufactured by Xerox Corporation) having a S.A.D. within a range of from 6.0 to 9.0 and a pH within a range of from 6 to 8 as measured by a cool water extraction method as described in JIS P8133, and the surface of the printed portion is measured under the above described measuring conditions to determine the S.A.D. The measured regions are portions other than fiber portions of the paper, and an average of four points (four regions) is taken as the data. The above-mentioned 4024 paper is an electrophotographic paper containing a rosin-type abietic acid as a sizing agent and from 1.8 to 2.2 wt % of Ti atoms in the paper.

As described above, with the recording liquid of the present invention, the S.A.D. of the printed portion is at least 59.5. However, with a view to improvement of the recording density, it is preferably at least 60.0, more preferably at least 62.0, most preferably at least 65.0. But, in consideration of smear, the S.A.D. is preferably at most 90.0, more preferably at most 85.0, further preferably at most 80.0, most preferably at most 70.0. Namely, in consideration of the overall performance of the recording liquid, it can not be said that the higher the S.A.D. value, the better, and it is advisable that the S.A.D. value is within the above-mentioned specific range. The present invention is based on the discovery of the optimum range for the S.A.D.

Further, it has been found that when the recording liquid of the present invention is used, it is possible to accomplish high density printing of such a level that the density OD of the printed portion is at least 1.5 as measured by means of a Macbeth reflection densitometer (RD914).

The recording liquid of the present invention has good storage stability as compared with conventional recording liquids and has a characteristic such that the change in the particle size distribution of the recording liquid is small even when stored at a high temperature for a long period of time. Specifically, it is possible to present a recording liquid whereby, when the particle size distribution measured immediately after the preparation of the recording liquid is compared with the particle size distribution measured after storing the recording liquid for one week at 70° C., to take differences for the respective fractions of the measured particle sizes, the total of such differences is at most 20%, preferably within a range of from 1 to 18%, more preferably from 2 to 15%. If this total value is too small, flocculation on a recording sheet when recorded, tends to be poor, whereby the printing density tends to be low, or printing irregularities tends to result, such being undesirable.

In the present invention, the method for calculating the total of differences between the particle size distribution immediately after the preparation of the recording liquid and the particle size distribution after storage of the recording liquid for one week at 70° C., is as follows.

① Measurement of the Particle Size Distribution Immediately after the Preparation of the Recording Liquid Firstly, the recording liquid immediately after the preparation, is used at the concentration as it is, and measurements are carried out by a particle size distribution meter (MicrotracUPA, sold by Nikkiso) under the following conditions.

Measuring Conditions (Input Parameters)
  Transparent Particles: No, Spherical Particles: No,
  Particle Refractive Index: 1.81
  Particle Density: 1.86
  Fluid Refractive Index: 1.33
  High Temp: 30.0° C., Viscosity: 0.797 cP
  Low Temp: 20.0° C., Viscosity: 1.002 cP
  Run Time: 300 (sec), Number of Runs: 2

An average value of two measurements conducted under the above measuring conditions, is taken as the value for the particle size distribution of the recording liquid.

② Measurement of the Particle Size Distribution of the Recording Liquid after Storage for One Week at 70° C.

The recording liquid is stored for one week at 70° C., and after the storage, it is returned to room temperature, and at the concentration as it is, the particle size distribution is measured by the same method as in the above item ① by a particle size distribution meter (MicrotracUPA, sold by Nikkiso), and an average value of two measurements, is taken as the value for the particle size distribution of the recording liquid.

The results obtained in item ② are compared with the results obtained in item ①, and differences are taken for the respective fractions of the measured particle sizes, and their total is calculated.

The reason as to why the recording liquid in the present invention provides the above-mentioned superior performance is not clearly understood, but may be explained as follows. When the recording liquid of the present invention is recorded on a recording material (a paper sheet or a film), the water-insoluble pigment contained therein readily undergoes flocculation, whereby the S.A.D. of the surface of the printed portion becomes to be at least 59.5, and thus a high recording density can be realized. While the recording liquid of the present invention undergoes flocculation on a recording material, it undergoes no flocculation during the storage of the recording liquid, and accordingly, a stabilized record can always be obtained. Conventional recording liquids did not have such apparently opposite properties at appropriate levels. In the field of coating materials, it has been taken for granted that the printing density is high when the surface of the printed portion is smooth i.e. the S.A.D. is small. Thus, it has been unexpected that the printed density becomes high when the S.A.D. of the surface of the printed portion is large, as in the present invention. Thus, the present invention is based on a discovery of the fact which is unexpected from the common knowledge of the prior art.

In the present invention, the characteristic of the recording liquid is defined by using as an index the S.A.D. (Surface Area Difference) of the printed portion, when printing has been carried out with 100% duty with a resolution of 600×300 dpi on an electrophotographic paper having a S.A.D. (Surface Area Difference) within a range of from 6.0 to 9.0 and a pH within a range of from 6 to 8. However, so long as the recording liquid satisfies such a definition, printing may be carried out on any recording sheet. For example, when the recording liquid of the present invention is employed for an ink jet recording method, the recording sheet may, for example, be a pulp paper such as an electrophotographic paper (such as Xerox 4024, Xerox 4200, Canon PB, Canon LC-301, Canon CP-250 or Epson KA425ONP), a regenerated paper (such as Xerox Green100 or Xerox R), a coated paper (such as Canon HR-101s, Lexmark 1402650, Lexmark 1402781, or HP 51634Z), a glossy paper (such as Canon GP-201, Canon GP-101, Canon HG-101, Canon HG-201, Canon BF-102, Canon BF-102, Canon KH-201, Epson MJA4SP6, Epson MJSP5, Lexmark 1402796, Lexmark 1372361, Lexmark 1372208, HP C6043A, or HP C5984A) or an OHP film (such as Canon CF-102, Epson MJOHPS1N, Lexmark 1402798, or HP C3835A).

To the recording liquid of the present invention, various additives may be incorporated. For example, a dispersant may be incorporated. Useful dispersants are not particularly limited and include, for example, various anion surfactants, nonionic surfactants, cationic surfactants, amphoteric surfactants and polymer type dispersants.

The anionic surfactants include, for example, fatty acid salts, alkyl sulfates, alkylbenzene sulfonates, alkylnaphthalene sulfonates, alkylsulfosuccinates, alkyldiphenylether disulfonates, alkyl phosphates, polyoxyethylenealkyl sulfates, polyoxyethylenealkylaryl sulfates, alkane sulfonates, naphthalene sulfonic acid-formalin condensates, polyoxyethylene alkylphosphates, and α-olefin sulfonates.

The nonionic surfactants include, for example, polyoxyethylenealkyl ethers, polyoxyethylenealkylaryl ethers, polyoxyethylene derivatives, oxyethylene/oxypropylene block copolymers, sorbitane fatty acid esters, polyoxyethylene sorbitol fatty acid esters, glycerol fatty acid esters, polyoxyethylene fatty acid esters, and polyoxyethylene alkylamines.

The cationic surfactants and amphoteric surfactants include, for example, alkylamine salts, quaternary ammonium salts, alkyl betaines and aminoxides.

The polymer type dispersants include, for example, poly(meth)acrylic acids, (α-methyl)styrene/(meth)acrylic acid copolymers, (α-methyl)styrene/(meth)acrylic acid/(meth)acrylate copolymers, (α-methyl)styrene/maleic acid copolymers, (α-methyl)styrene/maleic acid/(meth)acrylate copolymers, (α-methyl)styrene/methacrylic acid copolymers, (α-methyl)styrene/methacrylic acid/acrylate copolymers, (α-methyl)styrene/maleic acid half ester copolymers, α-olefin/allyl ether/maleic acid copolymers, (α-methyl)styrene/(α-methyl)styrene sulfonic acid copolymers, vinylnaphthalene/maleic acid copolymers, vinylnaphthalene/(meth)acrylic acid copolymers or their salts (such as alkali metal salts of e.g. lithium, sodium and potassium, or organic amine salts of e.g. triethanol amine, monoethanol amine, and 2-amino-2-propylalcohol). Here, (meth)acrylic acid means acrylic acid and/or methacrylic acid, and (α-methyl)styrene means styrene and/or α-methyl styrene. Among them, a polymer which serves as a dispersant and a binder for improving the smear property, is preferably employed. Especially from the viewpoint of the smear resistance of the record, it is preferred to add a polymer such as a block polymer, a graft polymer or a random polymer. From the viewpoint of the production cost, a graft polymer or a random polymer is preferred, and particularly preferred is a random polymer. The weight average molecular weight of such a polymer is preferably at most 50,000, more preferably at most 15,000, from the viewpoint of the jetting stability of the resulting recording liquid.

In the present invention, as a binder, an anionic polymer, a nonionic polymer, an amphoteric (betaine type) polymer, a cationic polymer or a resin emulsion may, for example, be incorporated.

Among these polymers, anionic polymers having anionic water-soluble groups selected from carboxylic (carboxylate) groups, sulfonic (sulfonate) groups and phosphoric (phosphate) groups, are preferably employed. However, a polymer having hydrophobic groups, or a polymer having anionic water-soluble groups having a pKa of at most 3, is further preferred from the viewpoint of the storage stability and jetting stability. Among them, a polymer having carboxylic (carboxylate) groups or sulfonic (sulfonate) groups, is most preferred from the viewpoint of the discharge stability and dispersibility, and particularly preferred is a polymer having sulfonic (sulfonate) groups.

As hydrophobic groups in the anionic polymer, a functional group having an aromatic ring, such as a phenyl group, a benzyl group or a naphtyl group, or a linear or branched alkyl, alkenyl or alkinyl group having at least 4 carbon atoms, which may be substituted, may, for example, be mentioned.

Specifically, the anionic polymer to be used in the present invention, may, for example, be a styrene/acrylic acid copolymer, a styrene/acrylic acid/acrylate copolymer, a styrene/maleic acid copolymer, a styrene/maleic acid/acrylate copolymer, a styrene/methacrylic acid copolymer, a styrene/methacrylic acid/acrylate copolymer, a styrene/maleic acid half ester copolymer, a styrene/styrene sulfonic (sulfonate) copolymer, a vinyl naphthalene/maleic acid copolymer, a vinyl naphthalene/acrylic acid copolymer, a naphthalene sulfonic acid-formalin condensate, a lignin sulfonic acid, or a salt thereof. Among them, a styrene/acrylic acid copolymer, a styrene/acrylic acid/acrylate copolymer, a styrene/maleic acid copolymer, a styrene/maleic acid/acrylate copolymer, a styrene/methacrylic acid copolymer, a styrene/methacrylic acid/acrylate copolymer, a styrene/maleic acid half ester copolymer, or a styrene/styrene sulfonic (sulfonate) copolymer, is further preferred. Further, in order to obtain a printed product which has a good color tone and which does not run with water, such an anionic polymer is preferably not colored. Accordingly, preferred is one whereby the maximum value of the absorbance within a range of from 380 to 780 nm, is at most 0.05 $g^{-1} \cdot l \cdot cm^{-1}$, particularly at most 0.01 $g^{-1} \cdot l \cdot cm^{-1}$.

To the recording liquid of the present invention, other additives such as a surface tension controlling agent or an antiseptic may further be incorporated.

In the present invention, the above-mentioned anionic polymer and the above-mentioned nonionic additive may be employed in combination. In such a case, the ratio in content of the anionic polymer and the nonionic additive is preferably from 12:1 to 1:1, more preferably from 10:1 to 2:1, from the viewpoint of the storage stability and the printing density.

The water-insoluble pigment to be used in the present invention may, for example, be an organic pigment, an inorganic pigment, a disperse dye or an oil-soluble pigment. Specifically, the following may mentioned.

Specific examples of a pigment to be used for an yellow ink, include C.I. pigment yellow 1, 2, 3, 12, 13, 14, 16, 17, 73, 74, 75, 83, 93, 95, 97, 98, 114, 128, 129, 151 and 154.

Further, specific examples of a pigment to be used for a magenta ink, include C.I. pigment red 5, 7, 12, 48(Ca), 48(Mn), 57(Ca), 57:1, 112, 123, 168, 184 and 202. Specific examples of a pigment to be used for a cyan ink, include C.I. pigment blue 1, 2, 3, 15:3, 15:34, 16, 22 and 60, C.I. bat blue 4 and 60. Other than the above, C.I. pigment red 209, 122, 224, 177 and 194, C.I. bat violet 43, C.I. bat violet 3, C.I. pigment violet 19, 23 and 37, C.I. pigment green 36, 7, or C.I. pigment plue 15:6 or 209, may also be used.

The oil-soluble pigment may, for example, be C.I. solvent yellow 16, 21, 25, 29, 33, 56, 82, 88, 89, 150, 151 or 163, C.I. solvent red 24 or 27, C.I. solvent blue 14, 25, 38, 48, 67, 68, 70 or 132, C.I. solvent black 3, 5, 7, 27, 28, 29 or 34. Other than the above, oil yellow 105 or 107, balifast yellow 1101 or 1105, balifast red 1306, balifast blue 1603, 1607 or 2610, balifast black 1802, 1807 or 3830 (the foregoing, manufactured by Orient Kagaku Kogyo K.K.), aizenspiron yellow GRLH or 3RH, aizenspiron blue GNH, 2BNH or BPNH, aizenspiron black MH or GMH (the foregoing, manufactured by Hodogaya Chemical Co., Ltd.), oleosol blue G, oleosol black AR (the foregoing, manufactured by Taoka Kagaku Kogyo K.K.), or orasol black RL1 (manufactured by Chiba Gaigy) may, for example, be mentioned. The disperse dye may, for example, be C.I. disperse yellow 3, 82 or 54, C.I. disperse red 60 or 191, or C.I. disperse violet 57.

Further, in the present invention, a carbon black such as acetylene black, channel black or furnace black may be employed. Among them, furnace black is preferred. The carbon black to be used, usually has a DBP oil absorption within a range of from 60 to 300 ml/100 g, preferably from 90 to 200 ml/100 g, from the viewpoint of the recording density, particularly preferably at least 140 ml/100 g. Further, the 24M4DBP oil absorption is preferably at least 80 ml/100 g, particularly preferably at least 90 ml/100 g. Further, the volatile content is usually within a range of at most 8 wt %, preferably at most 4 wt %, more preferably at most 3 wt %. In addition, the BET specific surface area is preferably at least 150 $m^2/g$ from the viewpoint of the storage stability and discharge stability, particularly preferably within a range of from 200 to 1,000 $m^2/g$. The primary particle size is preferably at most 40 nm from the viewpoint of the storage stability, more preferably at most 20 nm, further preferably at most 16 nm, most preferably at most 13 nm. Further, its pH is preferably from 2 to 10, particularly preferably from 6 to 9. Here, the DBP oil absorption of carbon black is a value measured by method A of JIS K6221, the volatile content is a value measured by the method of JIS K6221, the BET specific surface area is a value measured by method D of ASTM D3037, the pH is a value measured in accordance with JIS K6221, the 24M4DBP oil absorption is a value measured by the method of ASTM D3493, and the primary particle size is an arithmetic average diameter by an electron microscope.

Specifically, such carbon black may, for example, be #2600, #2300, #990, #980, #960, #950, #900, #850, #750, #650, MCF-88, MA-600, #95, #55, #52, #47, #45, #45L, #44, #40, #33, #32, #30, #25, #20, #10 or #5 (the foregoing, manufactured by Mitsubishi Chemical Corporation), Color Black FW1, FW2, FW2V, FW18, FW200, Special Black4, 4A, 5, 6, 100, 250, 350, 550, S160, S170, Printex U.V.140U, 140V, 95, 90, 85, 80, 75, 45, 40, P, 60, 300, 30, 35, 25, 200, A, G, 6, L (the foregoing, manufactured by Degussa), Regal415R, 330R, 1250R, 995R, Monarch800, 880, 900, 460, 280 or 120 (the foregoing, manufactured by Cabot), Raven 850, 780ULTRA, 760ULTRA, 790ULTRA, 520, 500, 410, 420, 430, 450, 460, 890 or 1020 (the foregoing, manufactured by Columbia).

In the present invention, among the above described water-insoluble pigments, a carbon black is particularly preferred.

The water-insoluble pigment to be used for the recording liquid of the present invention may be one having a water-insoluble pigment chemically treated (such as oxidation treatment or fluorination treatment) or one having a dispersant, a surfactant, etc., physically or chemically bonded (e.g. by graft treatment, or one having a dispersant preliminarily adsorbed prior to dispersion), so long as it is one having the above physical properties. The aqueous medium to be used for the recording liquid of the present invention comprises water as the main component and is preferably one having a water-soluble organic solvent added to water. The water-soluble organic solvent may, for example, be ethylene glycol, propylene glycol, butylene glycol, diethylene glycol, triethylene glycol, polyethylene glycol (#200 or #400), glycerol, an alkyl ether of such a glycol, N-methylpyrrolidone, 1,3-dimethylimidazolinone, thiodiglycol, 2-pyrrolidone, sulforan, dimethylsulfoxide, diethanolamine, triethanolamine, methanol, ethanol or iso-propanol.

The recording liquid of the present invention may contain in addition to the above described components, a water-soluble resin, a fungicide, a disinfectant, a pH-controlling agent or urea, as the case requires.

The recording liquid of the present invention may be prepared in such a manner that the above-mentioned respective components are mixed, and the water-insoluble pigment is pulverized into fine particles and dispersed by means of a dispersing machine. The dispersing machine may, for example, be a jet mill such as a nanomizer or an ultimizer whereby pulverization can be carried out without employing a medium, as well as a ball mill, a roll mill or a sand grind mill. Particularly preferred is a sand grind mill or a jet mill free from contamination derived from a medium.

After the pulverization and dispersion, coarse particles are removed by means of a filtration machine or a centrifugal separator. Components other than the water-insoluble pigment, the dispersant and water, may be added after the pulverization and dispersion treatment. The pulverization and dispersion treatment can be effectively carried out by preparing the liquid at a high concentration. Accordingly, it is preferred that a treated liquid prepared at a high concentration is finally diluted with an aqueous medium to adjust the concentration of the recording liquid.

It is preferred to adjust the average particle size of the water-insoluble pigment in the recording liquid within a range of from 0.01 to 0.4 μm from the viewpoint of the dispersion stability and the jetting stability. The average particle size is more preferably from 0.01 to 0.3 μm. most preferably from 0.1 to 0.3 μm. Further, the maximum particle size of the water-insoluble pigment is at most 5 μm, from the viewpoint of the dispersion stability and the jetting stability.

The composition of the recording liquid is not particularly limited, but in order to obtain a record wherein the S.A.D. of the printed portion is at most 59.5 as defined by the present invention, such can be accomplished by optimizing the type of the water-insoluble pigment and the blend proportion of the dispersant.

The amount of the water-insoluble pigment is usually within a range of from 1 to 20 wt. %, based on the total weight of the recording liquid, preferably from 3 to 15 wt %, more preferably from 5 to 15 wt. %. The amount of the dispersant is usually within a range of form 2 to 100 wt %, based o the weight of the water-insoluble pigment, preferably from 3 to 50 wt. %, more preferably from 5 to 20 wt. %, most preferably from 5 to 15 wt %. In one embodiment the recording liquid comprises 100 parts by weight of carbon black having a DBP oil absorption of at least 140 ml/100 g and from 5 to 15 parts by weight of a polymer dispersant.

The amount of the water-soluble organic solvent in the recording liquid is usually within a range of from 5 to 30 wt %, preferably from 10 to 20 wt %. The amount of a polymer which serves as a dispersant and/or a smear resistance-improving agent, is preferably within a range of from 0.1 to 5 wt %, more preferably from 0.2 to 3 wt %.

The object of the present invention can readily be accomplished by a recording liquid prepared especially in such a manner that as the water-insoluble pigment, one having a DBP oil absorption of at least 140 ml/100 g is selected, and dispersant is incorporated in an amount of from 5 to 15 wt %, based on the carbon black.

More preferably, in such a recording liquid, a carbon black having a primary particle size of at most 20 nm is used. Particularly preferably, a carbon black having a BET specific surface area of from 200 to 1,000 $m^2/g$ or a volatile content of at most 4%, is employed. Further, an excellent recording liquid can be obtained by selectively using a carbon black having preferred physical properties, as mentioned above with respect to the carbon black.

With respect to the water-insoluble pigment, the dispersant, the additive and the organic solvent, a single type of substance may be employed alone, but, in some cases, two or more different types of substances may be used in combination, to further improve the effects of the present invention.

In the ink jet recording method of the present invention, a recording liquid prepared as described above will be employed, and printing is carried out by jetting droplets of the recording liquid in accordance with a conventional method, whereby a printed product of high quality can be obtained under good jetting stability.

Now, the present invention will be described in further detail with reference to Examples. However, it should be understood that the present invention is by no means restricted to such specific Examples. In the following Examples, "parts" and "%" mean "parts by weight" and "% by weight", respectively.

EXAMPLE 1

| Preparation of recording liquid | |
|---|---|
| Composition of recording liquid | Amount (parts) |
| Carbon black (A) | 4.0 |
| Na salt of copolymer of styrene/acrylamide-2-methylpropane sulfonic acid/(2,4-dihydroxybenzophenone) adduct of glycidyl methacrylate (random polymer: weight ratio of monomers = 30/50/20, weight average molecular weight = 6,000) | 0.4 |
| 1,3-Dimethyl-2-imidazolidinone | 4.0 |
| Deionized water | 35.6 |
| Total | 44.0 |

The above-identified components were taken into a cylindrical stainless steel container and subjected to dispersion treatment for 40 hours by means of a sand grinder together with 67 parts of glass beads having an average size of 0.5 mm. To the obtained liquid, 0.1 part of Olfin E1010 (acetylene glycol ethylene oxide adduct, HLB: 13, manufactured by Shinetsu Chemical Co., Ltd.) and 5 parts of deionized water were added and thoroughly stirred. Then, 4 parts of glycerol, 3 parts of ethanol and 43.9 parts of deionized water were further added thereto. This liquid was filtered under pressure by means of No. 5C filter paper, and the liquid thereby obtained was used as a recording liquid.

Printing Test

The recording liquid obtained by the method disclosed in the above Example, was filled into a black cartridge (HP51629A) for DeskWriter660C manufactured by Hewlett Packard, which was preliminarily cleaned, and the cartridge was set in a printer. A black solid of 5 cm×5 cm was prepared (100% Duty) on the after-mentioned Mac Draw, and ink jet recording was carried out on an electrophotographic paper (Xerox 4024 paper, manufactured by Xerox Corporation, the pH of the paper was 6.4 as measured by a cool water extraction method as disclosed in JIS P8133) under the following conditions.

Printing Conditions

Printer: DeskWriter660C, manufactured by Hewlett Packard

Ink Cartridge: HP51629A

Computer: Macintosh Performa550

Software: Mac Draw II 1. 1

Print Option: Monochromatic Printing

Paper Setting Paper Size: A4, Paper: Pulp Paper

Option Density Setting: Normal,

Ink Control: Automatic,

Half Tone: Automatic,

Color Adjustment: Automatic

Print Quality: Normal (600×300 dpi)

As a result, jetting performance was good and constant without clogging, and a printed product of good printing quality was obtained. The results of evaluation by the following methods are shown in Table 1.

Measurement of S.A.D.

The S.A.D. of the solid portion of the printed product obtained by the above printing test was measured under the following measuring conditions.

Measuring Method

Apparatus: Scanning Probe Microscope

Type of Machine: NanoScope III, manufactured by Digital Instruments Company

Scanner: J-Head

Measured Region: 1 μm×1 μm

Number of Pixels: 512×512

Scan Rate: 1.5 Hz

Measuring Mode: Tapping AFM

Probe: Si-DF 20, manufactured by Seiko Instruments Co., Ltd.

Image Treatment: Planefit Auto tertiary

Under the above conditions, the surface of the printed portion was measured, and the S.A.D. was calculated. The measured regions were portions other than fiber portions of the paper, and an average of four points (four regions) was taken as the data.

Evaluation of Printing Density

The density of the printed product obtained by the above printing test was measured by means of a Macbeth reflection densitometer (RD914). The results were evaluated under the following standards and shown in Table 1.

◎: OD being at least 1.5

○: OD being at least 1.4 and less than 1.5

Δ: OD being at least 1.3 and less than 1.4

X: OD being less than 1.3

Water Resistance Test

The printed product obtained in the printing test, was immersed in city water in a beaker for 5 seconds. The printed product was dried, and the presence or absence of print smudging was visually evaluated. The results were evaluated under the following standards and shown in Table 1.

○: no substantial print smudging observed.

Δ: slight print smudging observed, but practically no problem.

X: substantial print smudging observed.

Light Resistance Test

The printed product was irradiated for 100 hours by means of a xenon fade meter (manufactured by Suga Shikenki K.K.), whereupon discoloration was visually evaluated. The results were evaluated under the following standards and shown in Table 1.

○: good

Δ: slight discoloration observed, but practically no problem.

X: substantial discoloration observed.

Measurement of Particle Size Distribution

The obtained recording liquid was, at the concentration as it was, subjected to the measurement of the particle size distribution by a particle size distribution meter (MicrotracUPA, sold by Nikkiso).

Measuring Conditions

Transparent Particles: No, Spherical Particles: No,

Particle Refractive Index: 1.81

Particle Density: 1.86

Fluid Refractive Index: 1.33

High Temp: 30.0° C., Viscosity: 0.797 cP

Low Temp: 20.0° C., Viscosity: 1.002 cP

Run Time: 300 (sec), Number of Runs: 2

An average value of two measurements conducted under the above measuring conditions, was taken as the value of the particle size distribution of the recording liquid. As a result, the average particle size of the recording liquid obtained in Example 1 was 0.068 μm.

Storage Stability Test

The obtained recording liquid was stored for one week at 70° C., and after the storage, it was returned to room temperature and at the concentration as it was, subjected to the measurement of particle size distribution in the same method as described above by a particle size distribution meter (MicrotracUPA, sold by Nikkiso). The obtained results were compared with the results of the above test of particle size distribution, to take differences for the respective fractions of the measured particle sizes, and the total of the differences (%) was calculated.

EXAMPLE 2

| Preparation of recording liquid | |
|---|---|
| Composition of recording liquid | Amount (parts) |
| Carbon black (B) | 4.0 |
| Na salt of copolymer of styrene/acrylamide-2-methylpropane sulfonic acid/(2,4-hydroxybenzophenone) adduct to glycidyl methacrylate (random polymer: weight ratio of monomers = 30/50/20, weight average molecular weight = 6,000) | 0.4 |
| 1,3-Dimethyl-2-imidazolidinone | 4.0 |
| Deionized water | 35.6 |
| Total | 44.0 |

The above-identified components were taken into a cylindrical stainless steel container and subjected to dispersion treatment for 3 hours by means of a sand grinder together with 152 parts of zirconia beads having an average size of 0.5 mm. To the obtained liquid, 4 parts of glycerol, 3 parts of ethanol and 49 parts of deionized water were added and thoroughly stirred. Then, this liquid was filtered under pressure by means of No. 5C filter paper, and the liquid thereby obtained was used as a recording liquid. The average particle size of the obtained liquid was 0.180 μm. Further, using the recording liquid obtained here, printing and evaluation were carried out in the same manner as in Example 1. The results are shown in Table 1.

EXAMPLE 3

| Preparation of recording liquid | |
|---|---|
| Composition of recording liquid | Amount (parts) |
| Color Black FW18 (manufactured by Degussa) | 4.0 |
| Na salt of copolymer of styrene/acrylamide-2-methylpropane sulfonic acid/acrylic acid (random polymer: weight ratio of monomers = 50/30/20, weight average molecular weight = 8,000) | 0.4 |
| 1,3-Dimethyl-2-imidazolidinone | 4.0 |
| Deionized water | 35.6 |
| Total | 44.0 |

The above-identified components were taken into a cylindrical stainless steel container and subjected to dispersion treatment for 3 hours by means of a sand grinder together with 152 parts of zirconia beads having an average size of 0.5 mm. To the obtained liquid, 4 parts of glycerol, 3 parts of ethanol and 49 parts of deionized water were added and thoroughly stirred. Then, this liquid was filtered under pressure by means of No. 5C filter paper, and the liquid thereby obtained was used as a recording liquid. The average particle size of the obtained liquid was 0.103 μm. Further, using the recording liquid obtained here, printing and evaluation were carried out in the same manner as in Example 1. The results are shown in Table 1.

COMPARATIVE EXAMPLE 1

The ink of a commercial black ink cartridge for ink jet recording (HP C4840A, manufactured by Hewlett Packard) was withdrawn, and evaluation was carried out in the same manner as in Example 1. The results are shown in Table 1.

COMPARATIVE EXAMPLE 2

The S.A.D. of Xerox 4024 paper alone was measured and found to be 7.0. From this result, it was confirmed that the values of S.A.D. in Examples 1 to 3 and Comparative Example 1, 3, 4 and 5 were values derived from the recording liquids.

COMPARATIVE EXAMPLE 3

The ink of a commercial black ink cartridge for ink jet recording (HP 51645A, manufactured by Hewlett Packard) was withdrawn, and evaluation was carried out in the same manner as in Example 1. The results are shown in Table 1.

COMPARATIVE EXAMPLE 4

The ink of a commercial black ink cartridge for ink jet recording (HP 51629A, manufactured by Hewlett Packard) was withdrawn, and the evaluation was carried out in the same manner as in Example 1. The results are shown in Table 1.

COMPARATIVE EXAMPLE 5

The ink of a commercial black ink cartridge for ink jet recording (12A1970, manufactured b Lexmark Company) was withdrawn, and evaluation was carried out in the same manner as in Example 1. The results are shown in Table 1.

TABLE 1

| | S.A.D. | Storage Test (%) | Water Resistance Test | Light Resistance Test | Printing Density |
|---|---|---|---|---|---|
| Example 1 | 61.0 | 9.28 | ○ | ○ | ○ |
| Example 2 | 68.1 | 14.88 | ○ | ○ | ◎ |
| Example 3 | 61.9 | 13.20 | ○ | ○ | ○ |
| Comparative Example 1 | 59.2 | 23.52 | ○ | ○ | Δ |
| Comparative Example 3 | 43.5 | 26.50 | ○ | ○ | x |
| Comparative Example 4 | 43.2 | 19.04 | ○ | ○ | x |
| Comparative Example 5 | 23.6 | 18.72 | ○ | ○ | x |

In Table 1, the storage stability test (%) is the results obtained by taking differences in the particle size distribution between immediately after the preparation of the recording liquid and after storage for one week at 70° C. and calculating the total of the differences.

In the following Table 2, the physical properties of carbon blacks used in Examples 1 and 2 are shown.

TABLE 2

| | Particle Size (nm) | Specific Surface Area (m²/g) | DBP Oil Absorption (ml/100 g) | pH | FC or CC* | Volatile Content (wt %) |
|---|---|---|---|---|---|---|
| Carbon Black A | 15 | 262 | 147 | 5.0 | FC | 1.0 |
| Carbon Black B | 14 | 294 | 147 | 7.0 | FC | 3.0 |
| Color Black FW18 | 15 | 260 | 160 | 4.0 | CC | 4.5 |

*FC: Furnace Carbon Black
 CC: Channel Carbon Black

When the recording liquid of the present invention is employed, it is possible to obtain a stabilized recorded image with a high recording density and free from printing irregularities, even when recorded by ink jet recording on pulp paper or regenerated paper, and the storage stability and jetting stability are good, and further, it is possible to obtain a record which is excellent in fastness of an image, such as water resistance or light resistance. With such characteristics, the recording liquid of the present invention is useful not only for ink jet recording or writing but also as a recording liquid for other purposes.

What is claimed is:

1. A recording liquid comprising:
   carbon black having a DBP oil absorption of at least 140 ml/100 g and an average particle size of from 0.01 to 0.4 μm and having a pH value in a range of from 6 to 9;
   5 to 15 wt. % of a dispersant based on said carbon black; and
   an aqueous medium,
   wherein the dispersant is a polymeric dispersant.

2. The recording liquid according to claim 1, wherein the S.A.D. of the printed portion is within a range of from 60.0 to 90.0.

3. The recording liquid according to claim 1, wherein the primary particle size of the carbon black is at most 20 nm.

* * * * *